Feb. 21, 1950      M. G. LEONARD      2,498,285
STEERING CONTROL WITH PNEUMATIC PICKUP
Filed April 22, 1946      3 Sheets-Sheet 1
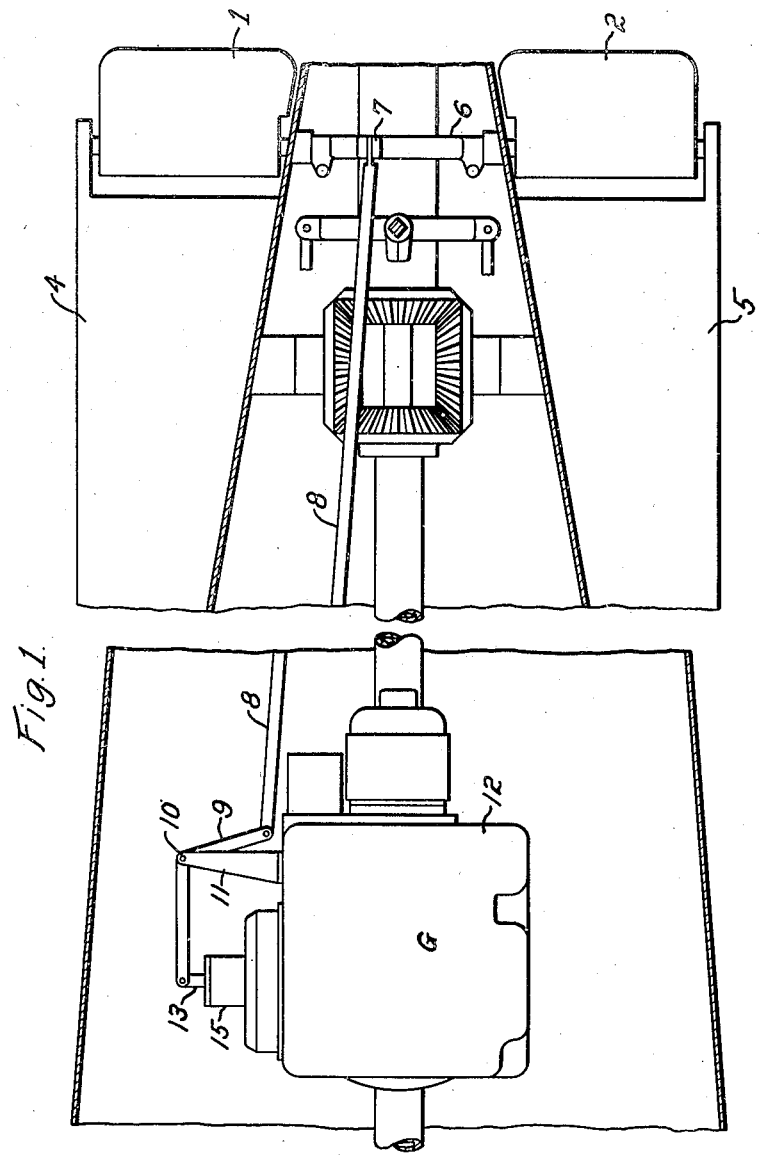
INVENTOR
Merrill G. Leonard.
BY
Paul E. Friedemann
ATTORNEY

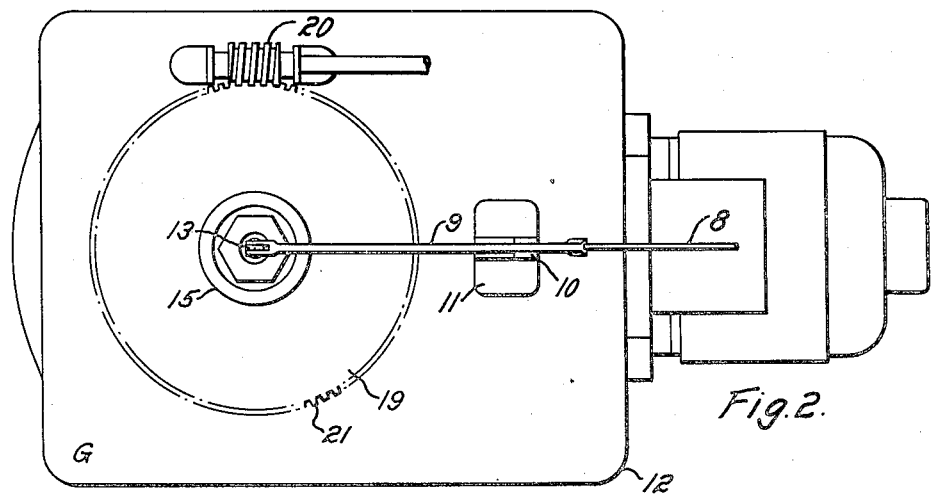
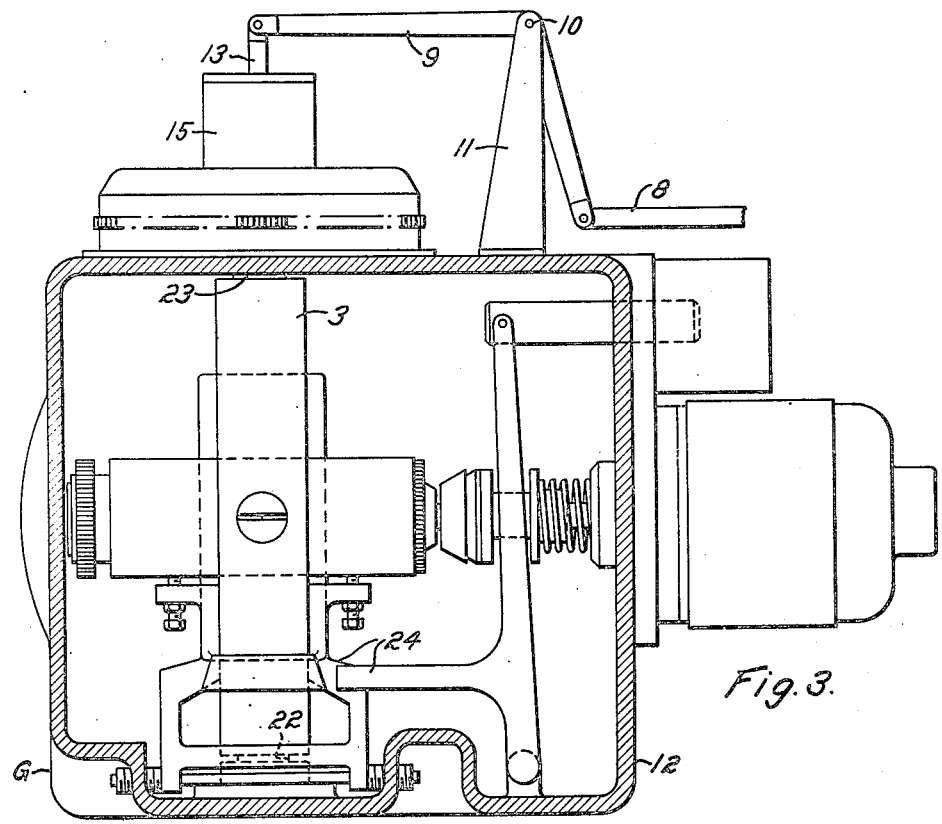

Feb. 21, 1950 M. G. LEONARD 2,498,285
STEERING CONTROL WITH PNEUMATIC PICKUP
Filed April 22, 1946 3 Sheets-Sheet 3

INVENTOR
Merrill G. Leonard.
BY
Paul E. Friedemann
ATTORNEY

Patented Feb. 21, 1950

2,498,285

UNITED STATES PATENT OFFICE 2,498,285

STEERING CONTROL WITH PNEUMATIC PICKUP

Merrill G. Leonard, Sharon, Pa., assignor to Westinghouse Electric Corporation, East Pittsburgh, Pa., a corporation of Pennsylvania Application April 22, 1946, Serial No. 663,806

7 Claims. (Cl. 114—23)

My invention relates to pneumatically controlled devices and more particularly to pneumatically controlled apparatus for controlling the direction of movement of a torpedo in azimuth with reference to a horizontal line of reference.

With the electrically propelled torpedo so generally used of late, electromagnetic devices are used to control the path of movement of the torpedo. In some applications electric power is not used or it is not practicable to use electric power for the control of the steering functions.

One broad object of my invention is the provision of torpedo rudder controlling devices of the nonelectrical type.

Another broad object of my invention is the provision of pneumatically controlled rudder actuating devices for a conveyance moving through a fluid medium.

A more specific object of my invention is the provision of pneumatic devices for controlling the angular movement of the steering rudders of a conveyance moving either through or on the surface of a fluid medium.

A still more specific object of my invention is the provision of pneumatic pick-ups on the steering gyro for a torpedo to thus control the steering rudders of the torpedo.

A still more specific object of my invention is the provision of a piston disposed in a cylinder for actuating the steering rudders of a torpedo by means of pneumatic elements operatively coupled to the direction indicating element of the steering gyro for the torpedo for actuating the piston.

Also a specific object of my invention is the provision of concentrically mounted cylinders on the angle setting head of a steering gyro for a torpedo wherein the inner cylinder houses a piston movable as a function of the operating effect of the gyro and the movement of the piston controls the steering rudders of a torpedo.

The objects hereinbefore stated are merely illustrative of many other objects and advantages that will become more apparent from a study of the following specification and the accompanying drawings, in which:

Figure 1 is a somewhat schematic showing in longitudinal section of the tailcone of a torpedo;

Fig. 2 is a plan view of the control gyro;

Fig. 3 is a side view of the control gyro;

Figure 4:
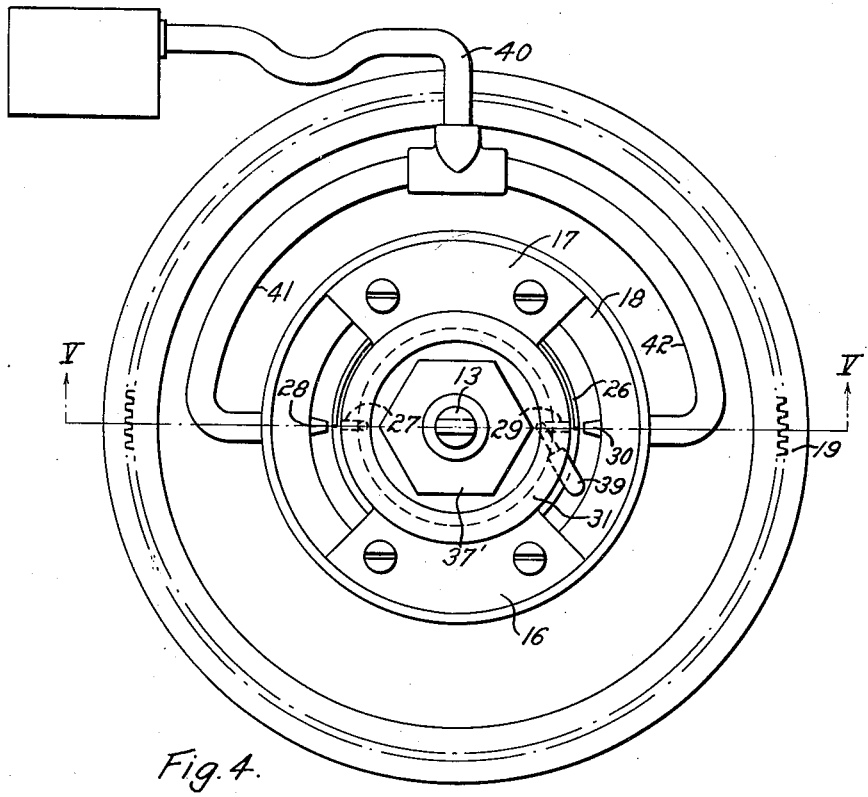
Fig. 4 is a plan view of the control gyro with the cover removed.

In Fig. 1 the tailcone T is shown somewhat schematic but in section to illustrate the arrangement of the control gyro G in its relation to the steering rudders 1 and 2. The control gyro may be of any suitable type and may be propelled in any suitable manner. The only alteration I make on the control gyro over the type heretofore in use is in the element actuated by the outer gimbal ring 3, see Figs. 3, 4 and 5. The details will be discussed hereinafter.

The steering rudders 1 and 2 are mounted in suitable bearings in the tailcone and the outboard aft ends of the stabilizing fins 4 and 5. The rudder actuating yoke 6 is operated by means of the crank arm 7 and link 8 coupled to the bell-crank lever 9 pivoted at 10 on the vertically disposed bracket 11 fixed to the gyro case 12 which in turn in fixed to the tailcone T.

Figure 5:
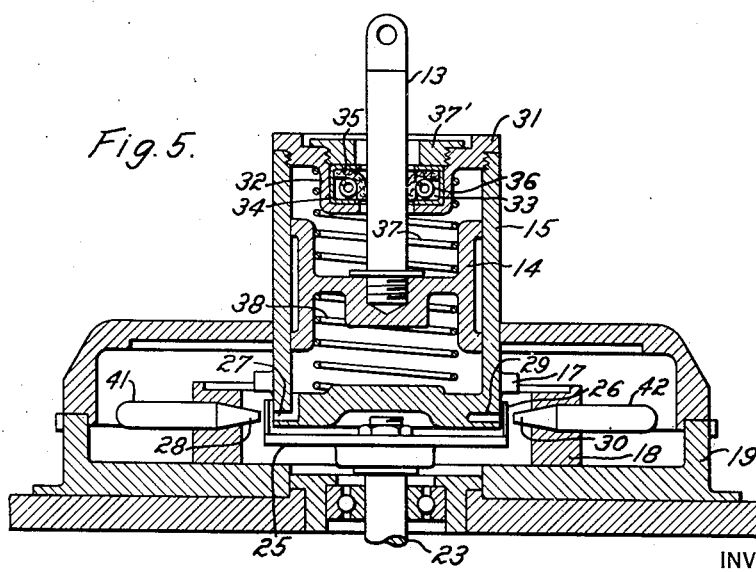
Fig. 5 is a side view on the vertical section plane indicated by section line V—V of Fig. 4, showing some of the details of my invention.

The bell-crank lever 9 is actuated angularly to operate the rudders by the piston rod 13 coupled to the piston 14 disposed in the cylinder 15. This cylinder 15 has fixed thereto a pair of radially directed flanges 16 and 17 bolted, as shown in Fig. 4 to an annulus 18 rigidly secured to the rotatably mounted course setting member 19. The course setting member may be moved angularly, to make either a straight shot, or an angle shot by the worm 20 engaging the gear teeth 21 on the course setting member 19.

The outer gimbal ring 3 has its trunnions 22 and 23 mounted in suitable antifriction bearings so that the gyro, after it is up to full speed and released by the unlatching devices 24, is free of the torpedo and may rotate freely with reference to the torpedo.

At the top of the upper trunnion 23 a flat disc 25 is mounted to rotate with the trunnion. This disc 25 is, at its periphery, provided with an axially directed blade 26 extending half way around the disc, as shown. The disc 25 and blade 26 are disposed in spaced relation to the cylinder 15. The spacing is rather close but there is no sliding contact with the cylinder nor any other elements near the blade 26. The disc 25 and blade 26 are the only elements attached to the trunnion 23 and since no sliding contact is provided anywhere the relative rotation of the torpedo relative to the disc 25 does in no way affect the direction control effect of the gyro.

When a straight shot is made the blade 26 is in such a position that the two end edges of the blade 26 cover, respectively, half of the opening 27 in the bottom of cylinder 15 and half of the opening of the nozzle 28 disposed in alignment with the opening 27, and half of the opening 29 in the bottom of cylinder 15 and half of the opening in the nozzle 30 disposed in alignment with the opening 29.

It is not absolutely essential that just half of the jets of fluid issuing from nozzles 28 and 30 be intercepted. The device will function as well if equal portions of the fluid jets are intercepted. In practice it is best to use the condition in which the reactions of the jets against the end edges of the blade would be as nearly balanced as possible throughout the control range.

The upper end of the cylinder 15 is provided with a closure 31 provided with the well 32 for receiving the fluid seal 33 consisting of a retaining ferrule 34, an L-shaped neoprene or rubber ring 35 held in firm but slidable engagement with the piston rod 13 by a garter spring 36. A suitable annular nut 37' threaded into the closure 31 holds the fluid seal 33 in place. The piston 14 is normally held in its mid-position, the position shown, by a pair of compression springs 37 and 38 positioned in the cylinder, as shown.

The opening 27 leads directly to the lower cylinder head whereas the opening 29 is connected to the upper cylinder head by a conduit 39. This conduit may, of course, be replaced by a channel in the cylinder wall.

The nozzles 28 and 30 are fixed in the ring 18 and are connected to a common conduit 40 by the conduits 41 and 42. The conduit 40 beyond the course setting member 19 is, by means of a flexible conduit, connected to a suitable source of air pressure. The source of pressure may comprise an air pump driven by the propulsion equipment or may be an air, or carbon dioxide, containing flask.

If the torpedo is of the type propelled by high velocity gases issuing from a nozzle in the tailcone, the gases being supplied by suitable motor means of the rocket type, then the conduit 40 may be supplied with gases under pressure by bleeding off a small amount of the propulsive fluid.

After the torpedo is under way the gyro control is to take effect air, or some other gas, issues from the nozzles at high velocity. If the end edges of the blade 26 are in the position shown the gas issuing from the nozzles enters the openings 27 and 29 in equal amounts thereby building up like pressures in the cylinder heads. The piston 14 is thus not moved because for this condition the torpedo is on course.

More often than not angle shots are made. When this condition obtains the course setting member 19 carrying the nozzles 28 and 30 and cylinder 15 is shifted angularly with reference to the blade 26. One opening, say opening 27, is thus completely covered whereas there is no interference whatsoever with the free movement of the gas from nozzle 30 into the opening 29. The air pressure in the upper cylinder head is thus built up while that in the lower cylinder head will decrease.

Since the bracket 11 is secured to the gyro case which, in turn, is fixed with reference to the torpedo, it is apparent that when the annulus 19 is turned to set the torpedo on its course the cylinder 15 turns with annulus 19 but the piston 14 does not rotate. It is capable only of longitudinal movements.

It will be noted that the arrangement of the cylinder 15 on the course setting head 19 in concentric relation to the annulus 18 and the baffle 26 provides important elements for a pneumatic pick-up for the steering control gyro that have substantially no reaction effect on the control function of the gyro. The gyro thus swings almost perfectly free of the craft on which it is mounted. Since the outer gimbal ring is not called upon to actuate a sliding contact physically engaging the course setting head the damping effect on the gyro swing is limited only to the bearing friction in the trunnions.

Under the conditions of an angle shot as just explained the bell-crank lever 9 is moved clockwise and the steering rudders are thrown in such a direction that the torpedo moves to such a position as to align the end edges of the blade 26 with the nozzles and the openings in the cylinder. The torpedo will then have made the angular swing required by the angle shot.

Since the torpedo is not likely to stay perfectly "on course" the relative position of the blade 26 and the nozzles 28 and 30 and the openings 27 and 29 will change. As this change takes place the pressure in the cylinder heads becomes different. The steering control effect caused by such difference in pressure is to steer the torpedo back to the exact direction required, that is, back "on course."

While I have shown and described but one embodiment of my invention, I do not wish to be limited to the exact disclosure made but wish to be limited only by the scope of the claims hereto attached.

I claim as my invention:

1. In the control for the steering rudders of a course setting member, and a torpedo having a control gyro for indicating, by the angular position of the upper trunnion of the outer gimbal ring with reference to the torpedo, the course of the torpedo with reference to the course set by the course setting member, in combination, a cylinder disposed axially of the trunnions of the outer gimbal ring and having upper and lower cylinder heads, a pair of nozzles disposed diametrically opposite the lower cylinder head, conduit means in communication with the nozzles, said nozzles, cylinder and conduit means being mounted in fixed relation to the course setting member to thus move with said course setting member, said cylinder being provided with openings in alignment with the nozzles with one of the openings being in communication with the lower cylinder head and the other being in communication with the upper cylinder head, said conduits being connected to a suitable source of fluid pressure to cause fluid at considerable velocity to issue from the nozzles, baffle means coupled to the trunnion of the outer gimbal ring adjacent the cylinder, said baffle means being disposed to move in the spacing between the openings in the cylinder and the nozzles to cause either equal pressures in the two cylinder heads or different pressures in the cylinder heads depending on whether the torpedo is "on course" or not on course, a piston in said cylinder disposed to move with changes in pressure in the cylinder heads, and connecting means between the piston and the steering rudders of the torpedo for causing operation of the rudders to cause "on course" operation of the torpedo.

2. In combination with the course setting head of the steering gyro for a conveyance moving through a fluid medium, in combination, a pair of concentric cylinders in the course setting head disposed in close spaced relation to each other, a pair of diametrically disposed nozzles in the outer cylinder, said nozzles being supplied with fluid under pressure to thus throw fluid under high velocity against the outer periphery of the inner cylinder, said inner cylinder being provided with openings aligned with the nozzles one opening providing a communication to the lower cylinder head and the other opening a communication to the upper cylinder head, a balanced piston disposed in the inner cylinder to thus be moved by the pressure difference in the cylinder heads, means for transmitting the piston movements to the steering rudders of the conveyance, and means mounted on one of the trunnions of the outer gimbal ring of the gyro and disposed to control the flow of fluid from the nozzles into the aligned openings for controlling the differential pressure in the cylinder heads as a function of the deviation of the conveyance from the course set for the conveyance.

3. In combination with the steering control for a torpedo, in combination, a steering control gyro, a course setting head at the upper end of the gyro, a pair of vertically disposed concentric cylinders disposed in close spaced relation to each other on said gyro head, a pair of diametrically disposed nozzles in the outer cylinder, said nozzles being connected to a suitable source of gas pressure to thus expel a jet of high velocity gas against the periphery of the inner cylinder, said inner cylinder having openings aligned with the nozzles and being in communication, respectively, with the top cylinder head and the bottom cylinder head, a balanced piston in the inner cylinder to thus be moved as a function of the difference in pressure in the cylinder heads, and baffle means secured to the upper trunnion of the gyro and disposed to control the flow of gas from the respective nozzles to the aligned openings for controlling the gas pressure in the cylinder heads.

4. In combination with the steering control for a torpedo, in combination, a steering control gyro, a course setting head at the upper end of the gyro, a pair of vertically disposed concentric cylinders disposed in close spaced relation to each other on said head, a pair of diametrically disposed nozzles in the outer cylinder, said nozzles being connected to a suitable source of gas pressure to thus expel a jet of gas at high velocity against the outer periphery of the inner cylinder, said inner cylinder having openings aligned with the nozzles and being in communication, respectively, with the top cylinder head of the inner cylinder and the bottom cylinder head of the inner cylinder, a balanced piston in the inner cylinder to thus be moved as a function of the difference in pressure in the cylinder heads, and a baffle segment disposed on the outer gimbal ring of the gyro for controlling the relative flow of the gas jets from the nozzles as a function of the departure of the torpedo from the course set by the course setting head.

5. In combination with the steering control for a torpedo, in combination, steering rudders for the torpedo, a steering control gyro, a course setting head at the upper end of the gyro, a pair of vertically disposed concentric cylinders disposed in close spaced relation to each other on said head, the inner cylinder having closure caps at each end to form two cylinder heads, a pair of diametrically disposed nozzles in the outer cylinder, said nozzles being connected to a suitable source of gas pressure to thus expel a jet of gas at high velocity against the outer periphery of the inner cylinder, said inner cylinder having openings, aligned with the nozzles, that are in communication, respectively, with the top cylinder head and the bottom cylinder head, a balanced piston in the inner cylinder to thus be moved as a function of the difference in pressure in the cylinder heads, a piston rod on said piston projecting through a fluid seal in the closure cap for the upper cylinder head, a coupling between the piston rod and the steering rudders, whereby the rudders of the torpedo are moved as a function of the movement of the piston with changes of the pressure difference in the cylinder heads, and means coupled to the gyro for controlling the pressure difference in the cylinder heads as a function of the departure of the torpedo from its set course.

6. In combination with a steering control gyro for a craft, a course setting head, an annulus disposed in the head and having an internal cylindrical surface, a cylinder having cylinder heads, said cylinder being disposed on the course setting head so that its lower end is concentric of the annulus but spaced a relatively short distance from the annulus, a jet nozzle, connected to a suitable source of gas pressure, disposed in the annulus so as to expel a jet of high velocity gas against the lower end of the cylinder, said cylinder having an opening in the lower end aligned with the jet nozzle, a spring biased piston in the cylinder, a movable baffle disposed in the space between the cylinder and annulus, said baffle having an edge for intercepting none, any proportion, or all of the gas being expelled by the jet nozzle depending on the position of the baffle edge to thus alter the gas pressure in the cylinder, means for moving the baffle as a function of the steering control effect of the gyro, steering rudders, and means for operatively connecting the piston to the steering rudders.

7. In combination with the steering control gyro used on a craft being automatically steered in a given path through a fluid medium, steering rudder for the craft, a course setting head on the gyro, a relatively short annulus having an internal cylindrical surface projecting upwardly from the bottom of the course setting head, a cylinder so mounted on the course setting head that its lower end is in spaced concentric relation to the annulus, said cylinder being provided with two channels in communication respectively with the cylinder heads of the cylinder and at spaced points with the space between the cylinder and annulus, means, including jet nozzles in the annulus in alignment with the channel openings in the lower end of the cylinder, for supplying the channels with a jet of fluid under dynamic pressure to thus produce substantially static fluid pressures in the cylinder heads, baffle means secured to the gyro and so disposed in relation to the outer channel openings that the relative static pressure effects in the cylinder heads is controlled as a function of the departure of the craft from the set course, a balanced piston in the cylinder, a piston rod projecting from the top cylinder head through a fluid pressure seal, and means for coupling the upper end of the piston rod to the steering rudders of the craft.

MERRILL G. LEONARD.

REFERENCES CITED

The following references are of record in the file of this patent:

UNITED STATES PATENTS

| Number | Name | Date |
|---|---|---|
| 1,197,134 | Leavitt | Sept. 5, 1916 |
| 1,296,330 | Shonnard | Mar. 4, 1919 |
| 2,226,191 | Alkan | Dec. 24, 1940 |
| 2,250,344 | Alkan | July 22, 1941 |
| 2,325,108 | Carlson | July 27, 1943 |